United States Patent
Heitplatz et al.

(10) Patent No.: US 9,278,811 B2
(45) Date of Patent: Mar. 8, 2016

(54) TRANSPORT APPARATUS WITH AN ENDLESS BELT-LIKE TRANSPORT MEMBER

(71) Applicant: BEUMER GmbH & Co. KG, Beckum (DE)

(72) Inventors: Heino Heitplatz, Drensteinfurt (DE); Philipp Schäfer, Büren (DE)

(73) Assignee: BEUMER GmbH & Co. KG, Beckum (DE)

( * ) Notice: Subject to any disclaimer, the term of this patent is extended or adjusted under 35 U.S.C. 154(b) by 0 days.

(21) Appl. No.: 14/611,290

(22) Filed: Feb. 2, 2015

(65) Prior Publication Data
US 2015/0232281 A1   Aug. 20, 2015

(30) Foreign Application Priority Data
Feb. 18, 2014   (DE) .......................... 10 2014 002 360

(51) Int. Cl.
*B65G 39/16*   (2006.01)
*B65G 23/04*   (2006.01)
*B65G 15/28*   (2006.01)

(52) U.S. Cl.
CPC ................ *B65G 23/04* (2013.01); *B65G 15/28* (2013.01)

(58) Field of Classification Search
CPC .................. B65G 39/00; B65G 39/10
USPC ................................................ 198/806, 808
See application file for complete search history.

(56) References Cited

U.S. PATENT DOCUMENTS

| | | | |
|---|---|---|---|
| 2011/0308660 A1* | 12/2011 | Berube .......................... | 138/171 |
| 2013/0048011 A1* | 2/2013 | Bickford et al. .............. | 132/320 |
| 2015/0166290 A1* | 6/2015 | Piatt et al. ..................... | 138/171 |

FOREIGN PATENT DOCUMENTS

| | | | |
|---|---|---|---|
| CH | 509450 | * | 8/1971 |
| GB | 205017 | * | 10/1923 |
| GB | 926085 | * | 5/1963 |

* cited by examiner

*Primary Examiner* — James R Bidwell
(74) *Attorney, Agent, or Firm* — Renner, Otto, Boisselle & Sklar, LLP

(57) ABSTRACT

A transport apparatus with an endless belt-like transport member, which is guided circulating in a conveying direction via a plurality of rotating return rollers, there being formed between a first return roller and a second return roller a transport section in which articles to be conveyed can be picked up and transported by the transport member, and wherein the first return roller has a convex outer lateral surface with a diameter that reduces outwards from a central plane arranged perpendicularly to an axis of rotation of the first return roller, and the second return roller has a concave outer lateral surface with a diameter that increases outwards from a central plane arranged perpendicularly to an axis of rotation of the second return roller.

14 Claims, 2 Drawing Sheets

TRANSPORT APPARATUS WITH AN ENDLESS BELT-LIKE TRANSPORT MEMBER

CROSS-REFERENCE TO RELATED APPLICATION/PRIORITY CLAIM

This application is based on and claims priority under 35 U.S.C. §119(a) to German Application No. 10 2014 002 360.5, filed 18 Feb. 2014, the entirety of which is hereby incorporated herein by reference.

TECHNICAL FIELD

The invention relates to a transport apparatus with an endless belt-like transport member, which is guided circulating in a conveying direction via a plurality of rotating return rollers, there being formed between a first and second return roller a transport section in which articles to be conveyed can be picked up and transported by the transport member, such as in the form of a belt conveyor with a conveyor belt, the width of which is relatively large compared to its length.

BACKGROUND

The problem of the invention consists in improving the steering behaviour especially of relatively short belt conveyors, such as belt conveyors used to deliver load items to sorting conveyors. Belt conveyors of this kind frequently exhibit poor straight-running characteristics of the belt, where the latter tends to run to one side, transversely to the conveying direction.

SUMMARY

According to the invention, this problem is solved in a transport apparatus of the generic kind by the step that the first return roller has a convex outer lateral surface with a diameter that reduces outwards from a central plane arranged perpendicularly to an axis of rotation of the first return roller, and the second return roller has a concave outer lateral surface with a diameter that increases outwards from a central plane arranged perpendicularly to an axis of rotation of the second return roller.

This kind of combination of a convex return roller with a concave return roller, at least one of which can be drivable, enables a centring effect of the circulating transport member because of the convex shape of the first return roller, and at the same time a tensioning of the transport member in the longitudinal direction which is at least partially evened out over the width of the transport member, compared to an arrangement with two convex return rollers or one convex and one cylindrical return roller.

It is conveniently contemplated that the axes of rotation of the first and second return rollers are parallel to one another. The axes of rotation may be arranged on the same height, so that the transport section runs substantially horizontally, or at different heights, so that the transport section runs uphill or downhill when seen in the conveying direction.

It may be contemplated that at least one outer lateral surface has an arcuate contour shape free of sharp bends. The contour shape may be like the arc of a circle, elliptical or parabolic. As a rule the outer lateral surfaces are symmetrical to the respective central plane.

Alternatively, it may be contemplated that at least one outer lateral surface has a plurality of contiguous sections, either bent or free of sharp bends, with a straight and/or arcuate contour shape.

In particular, it may be contemplated that at least one outer lateral surface has a central cylindrical section and sections adjacent to it on both sides with conical or concave or convex shapes.

In one embodiment, it may be contemplated that at least one outer lateral surface has two conical sections adjacent to one another.

It is preferably contemplated that, relative to a concentric cylindrical first reference surface with a first reference radius, the convex outer lateral surface has local first radius differences which are the same in magnitude as local second radius differences in the concave outer lateral surface relative to a concentric cylindrical second reference surface with a second reference radius, wherein the first reference radius is the radius of the first return roller spaced half a width of the transport member away from the central plane, and the second reference radius is the radius of the second return roller spaced half a width of the transport member away from the central plane. Alternatively, the radius of the first or second return roller at the central plane may be chosen as the first and second reference radii. In a configuration of this kind, the return rollers are shaped with the same degree of convexity and concavity, or the convex outer lateral surface is configured to be complementary to the concave outer lateral surface with respect to a local radius. In a configuration of this kind, the advantage is that the transport member has a constant local longitudinal tension over its width, since convex regions of the first return roller are compensated by opposing concave regions of the second return roller.

In order to improve the centring effect, only partial compensation of the convex regions of the first return roller may be contemplated, wherein the convex outer lateral surface has first local differences in diameter with respect to a concentric cylindrical reference surface with a first reference radius which is greater in magnitude than second local radius differences of the concave outer lateral surface with respect to a concentric cylindrical reference surface with a second reference radius, or in other words a more convex than concave configuration of the return rollers. In this context, it may be contemplated that the second local radius differences are at least 10%, 50% or 90% of the first local radius differences, so that the convexity of the first return roller is at least 10%, 50% or 90% compensated by the concavity of the second return roller.

The transport member may have a width which is at least 20%, 50%, 75%, 100%, 150%, 200%, 250% or 350% of an axial spacing between the first and second return rollers.

BRIEF DESCRIPTION OF THE DRAWINGS

The invention will now be explained by describing working examples, reference being made to a drawing, in which.

DETAILED DESCRIPTION

Figure 1:
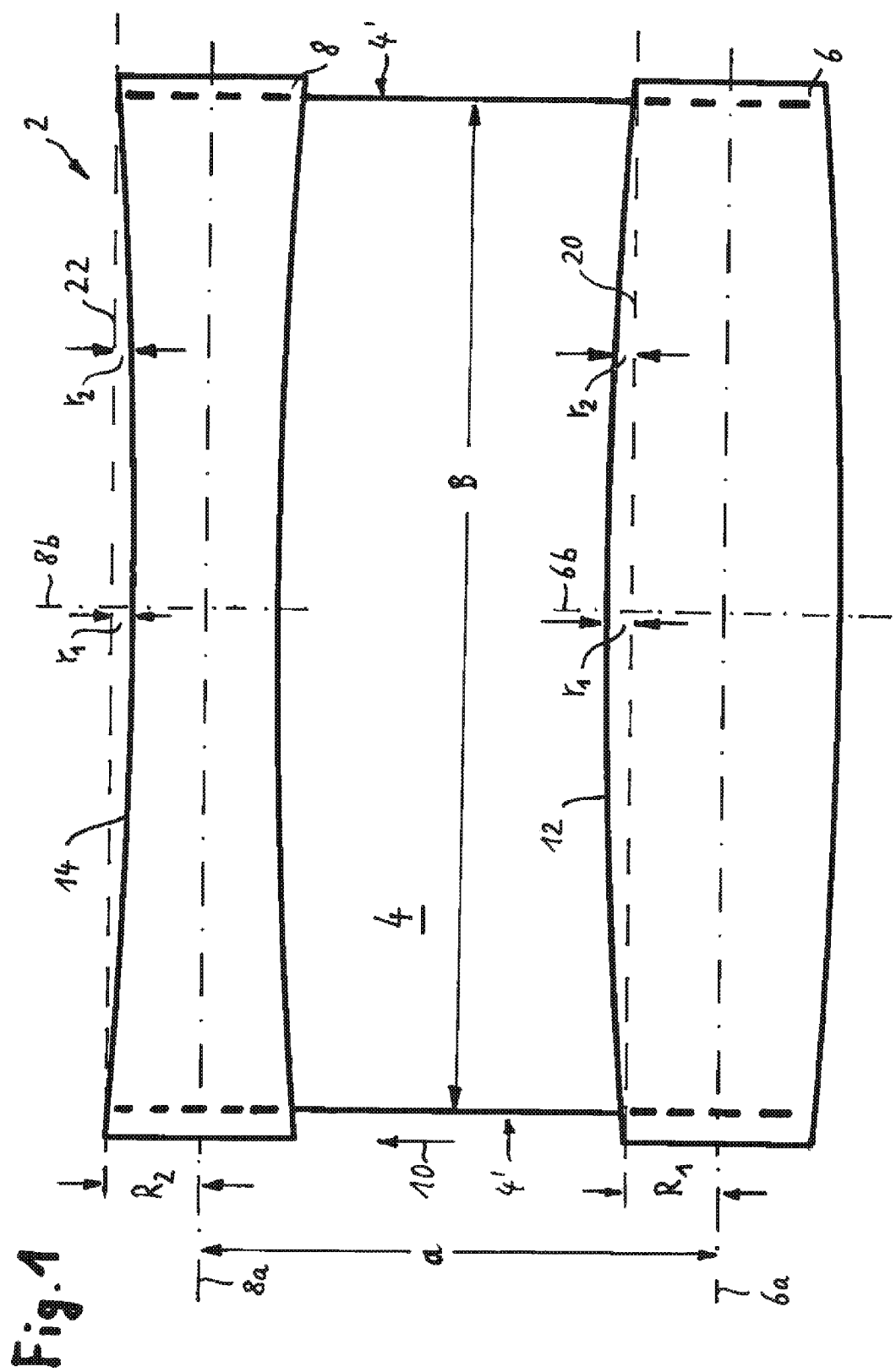
FIG. 1 shows a schematic view of a first embodiment of a transport apparatus in accordance with the invention, seen from above.
Figure 2:
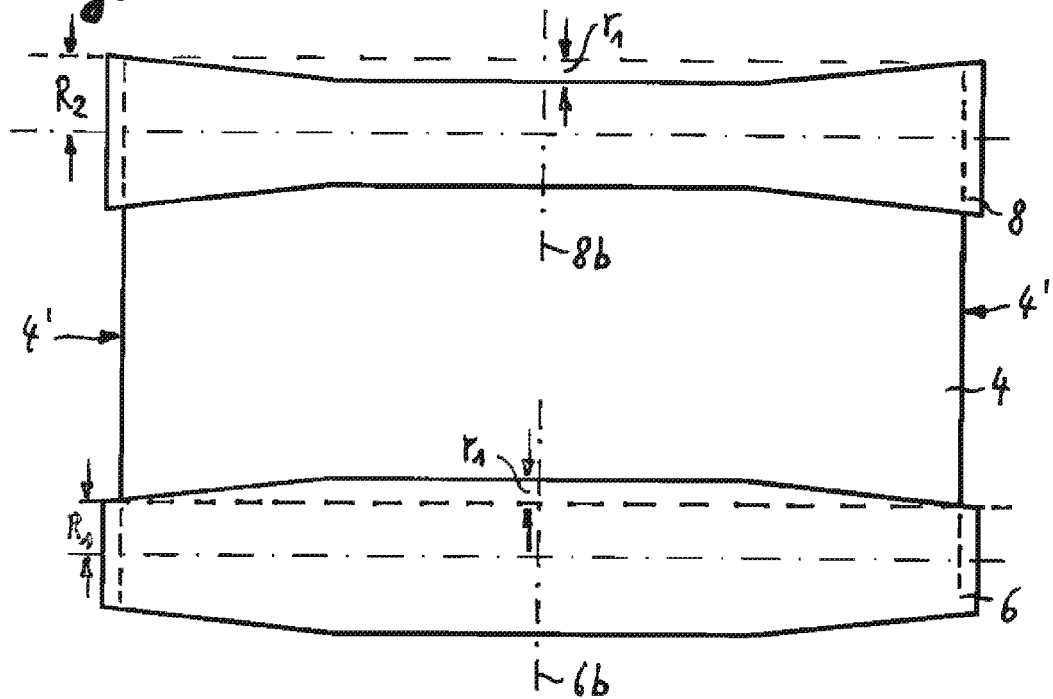
FIG. 2 shows a schematic view of a second embodiment of a transport apparatus in accordance with the invention, seen from above.
Figure 3:
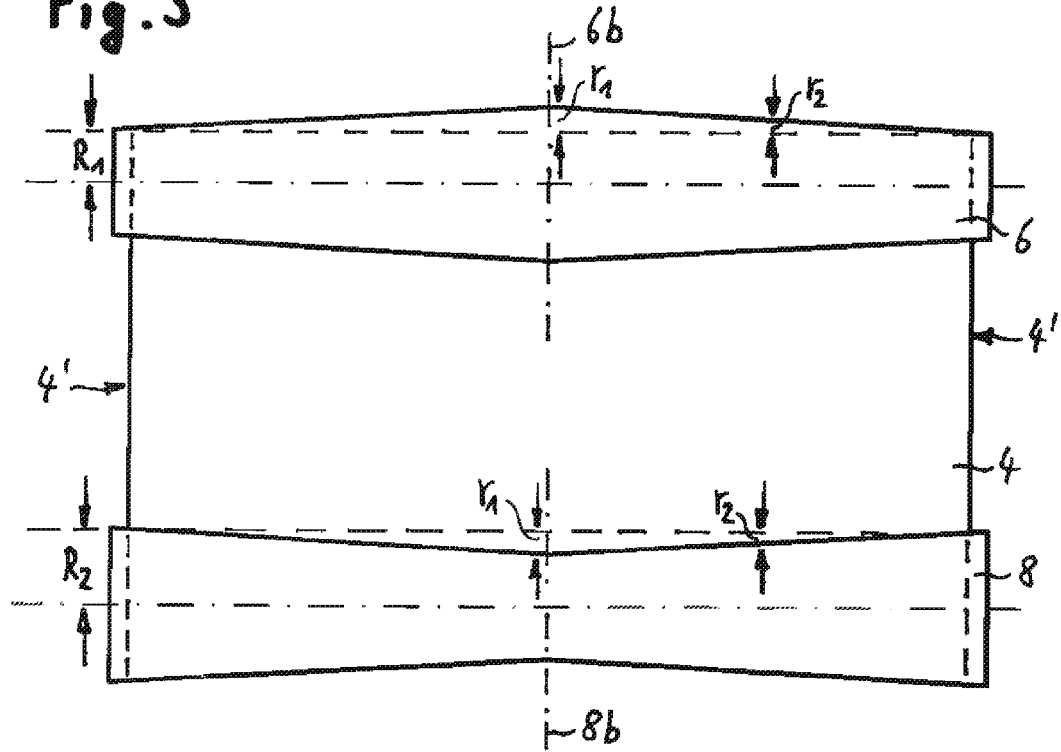
FIG. 3 shows a schematic view of a third embodiment of a transport apparatus in accordance with the invention, seen from above.

FIGS. 1 to 3 show schematic views of a plurality of embodiments of the invention, seen from above, which differ substantially in the specific shape of the convex or concave return rollers.

In a first embodiment in accordance with FIG. 1, a transport apparatus indicated in its entirety by 2 comprises an endless, belt-like transport member 4 in the form of a slightly elastic conveyor belt. The transport member 4 is guided circulating over a first return roller 6 and a second return roller 8 in a conveying direction 10. In the region of the return rollers 6, 8, lateral edges 4' of the transport member 4 are indicated by dashed lines.

The first return roller 6 is mounted so as to run freely or to be rotatably driven about an axis of rotation 6a, and the second return roller 8 is mounted so as to run freely or to be rotatably driven about an axis of rotation 8a at an axial distance a from the axis of rotation 6a. The first return roller 6 has a convex outer lateral surface 12, with a diameter that reduces outwards from a central plane 6b running perpendicularly to the axis of rotation 8a, and the second return roller 8 has a concave outer lateral surface 14 with a diameter that increases outwards from a central plane 8b running perpendicularly to the axis of rotation 8a.

In FIG. 1, in addition to the convex and concave outer lateral surfaces 12, 14 of the return rollers 6, 8, a first and second cylindrical reference surface 20, 22 is also illustrated, which serves to quantify the convexity or concavity of the return rollers 6, 8. A first reference radius $R_1$ as the radius of the first cylindrical reference surface 20 is defined such that at the lateral edges 4' of the transport member 4, the radius of the reference surface 20 is the same as the local radius of the outer lateral surface 12, whereas in the region of the central plane 6b, a greatest difference in radius results. The same applies, mutatis mutandis, to the second reference surface 22 with a second reference radius $R_2$. In FIG. 1, local radius differences $r_1$ in the region of the central planes 6b, 8b and $r_2$ approximately in the middle between the central plane and a lateral edge 4' of the transport member 4 are shown by way of example. With the shape of the return rollers 6, 8 chosen in the first embodiment, the local radius differences at the same parts of the return rollers, illustrated by way of example by the radius differences $r_1$ and $r_2$, is of the same magnitude in both return rollers 6, 8, so that the convexity of the first return roller 6 completely compensates the concavity of the second return roller 8, in the sense that, in every position of its width extent, seen transversely to the conveying direction 10, the transport member 4 has a constant longitudinal tension acting in the conveying direction 10, comparable to a case in which the two return rollers 6, 8 are cylindrical.

Alternatively, the reference surfaces 20, 22 might have a reference radius $R_1$, $R_2$ which corresponds to the radius of the respective return roller 6, 8 at the central plane 6b, 8b.

In one variant, it may be contemplated that the first return roller 6 has a more convex configuration than the concave configuration of the second return roller 8, wherein the first, convex return roller 6 has greater radius differences with respect to its reference surface than the second return roller with respect to its own reference surface, so that there is no complete compensation of the convexity of the first return roller by the concavity of the second return roller, and in a central region near the central planes 6b, 8b, the transport member 4 is stretched more in the longitudinal direction 10 than in the region of the lateral edges 4', which favours the centring effect.

Conversely, it is possible to make the convexity of the first return roller 6 less pronounced than the concavity of the second return roller 8, so that the radius differences of the first return roller 6 are then smaller than corresponding radius differences of the second return roller 8.

FIG. 2 shows a further embodiment of a transport apparatus in accordance with the invention, in which the outer lateral surfaces of the two return rollers 6, 8 are not configured so as to be continuously arcuate as in the first embodiment, but instead consist of a cylindrical central section and two outer sections adjoining it without steps, which expand or taper conically.

Here too, the arrangement is made in such a way that the convex outer lateral surface 12 of the first return roller 6 has local first radius differences with respect to a concentric cylindrical first reference surface 20, which are illustrated by way of example by a radius difference $r_1$ in the region of the central plane 6b, and which are the same in magnitude as local second radius differences in the concave outer lateral surface 14 of the second return roller 8 with respect to a concentric cylindrical second reference surface 22, again illustrated by a radius difference $r_1$ in the region of the central plane 8b. Once again, the first reference radius $R_1$ of the first reference surface 20 is the radius of the first return roller 6 spaced half a width B of the support member 4 away from the central plane 6b, i.e. at the position of the lateral edge 4' of the support member 4, and the second reference radius $R_2$ of the second reference surface 22 is the radius of the second return roller 8 spaced half a width of the support member 4 away from the central plane 8b of the second return roller 8, i.e. likewise at the position of a lateral edge 4' of the support member 4.

It is also a consequence of this design of the diameter of the return rollers 6, 8 that the local longitudinal tension of the support member 4 transversely to the conveying direction 10 is substantially constant.

FIG. 3 shows an example embodiment with return rollers the outer lateral surfaces of which are each formed from two conical sections adjacent to one another at the central plane 6b and 8b. In this case too, the local diameters of the two return rollers 6, 8 are designed such that the radius differences $r_1$, $r_2$ correspond to and thus compensate one another with respect to the cylindrical reference surfaces 20, 22. Also in this case, a belt-like transport member 4 which, in the original state, has a same circumferential length in each width position, therefore has a substantially uniform longitudinal tension in each width position in the state when placed on the return rollers 6, 8.

LIST OF REFERENCE NUMERALS 2 transport apparatus
4 support member
4' lateral edge
6 first return roller
6a axis of rotation
6b central plane
8 second return roller
8a axis of rotation
8b central plane
10 conveying direction
12 convex outer lateral surface
14 concave outer lateral surface
20 first cylindrical reference surface
22 second cylindrical reference surface
a axial spacing (of 6, 8)
B width (of 4)
$R_1$ first reference radius (of 20)
$R_2$ second reference radius (of 22)
$r_1$, $r_2$ radius differences

The invention claimed is:

1. A transport apparatus with an endless transport member, which is guided circulating in a conveying direction via a plurality of rotating return rollers, there being formed between a first return roller and a second return roller a transport section in which articles to be conveyed can be picked up and transported by the transport member, characterised in that the first return roller has a convex outer lateral surface with a diameter that reduces outwards from a central plane arranged perpendicularly to an axis of rotation of the first return roller, and the second return roller has a concave outer lateral surface with a diameter that increases outwards from a central plane arranged perpendicularly to an axis axis of rotation of the second return roller, wherein the transport member has a constant width (B) and the width (B) is at least 150% of an axial spacing (a) between the first and second return rollers.

2. The transport apparatus as claimed in claim 1, characterised in that at least one outer lateral surface has an arcuate contour shape free of sharp bends.

3. The transport apparatus as claimed in claim 2, characterised in that the contour shape is like the arc of a circle, elliptical or parabolic.

4. The transport apparatus as claimed in claim 1, characterised in that at least one outer lateral surface has a plurality of contiguous sections, either bent or free of sharp bends, with a straight and/or arcuate contour shape.

5. The transport apparatus as claimed in claim 4, characterised in that at least one outer lateral surface has a central cylindrical section and sections adjacent to it on both sides with conical or concave or convex shapes.

6. The transport apparatus as claimed in claim 1, characterised in that at least one outer lateral surface has two conical sections adjacent to one another.

7. The transport apparatus as claimed in claim 1, characterised in that, relative to a concentric cylindrical first reference surface with a reference diameter ($R_1$), the convex outer lateral surface has local first radius differences ($r_1$, $r_2$) which are the same in magnitude as local second radius differences ($r_1$, $r_2$) in the concave outer lateral surface relative to a concentric cylindrical second reference surface with a second reference radius ($R_2$), wherein the first reference radius ($R_1$) is the radius of the first return roller spaced half a width (B) of the transport member away from the central plane, and the second reference radius ($R_2$) is the radius of the second return roller spaced half a width (B) of the transport member away from the central plane.

8. The transport apparatus as claimed in claim 1, characterised in that the convex outer lateral surface has local first radius differences ($r_1$, $r_2$) with respect to a concentric cylindrical first reference surface with a reference diameter ($R_1$) which is greater in magnitude than local second radius differences ($r_1$, $r_2$) of the concave outer lateral surface with respect to a concentric cylindrical second reference surface with a second reference radius ($R_2$), wherein the first reference radius ($R_1$) is the radius of the first return roller spaced half a width (B) of the transport member away from the central plane, and the second reference radius ($R_2$) is the radius of the second return roller spaced half a width (B) of the transport member away from the central plane.

9. The transport apparatus as claimed in claim 7, characterised in that the transport member has a local longitudinal tension, seen in the conveying direction, which is constant over a width (B) of the transport member.

10. The transport apparatus as claimed in claim 1, characterised in that the width (B) is at least 200%, of an axial spacing (a) between the first and second return rollers.

11. The transport apparatus as claimed in claim 2, characterised in that at least one outer lateral surface has a plurality of contiguous sections, either bent or free of sharp bends, with a straight and/or arcuate contour shape.

12. The transport apparatus as claimed in claim 11, characterised in that at least one outer lateral surface has a central cylindrical section and sections adjacent to it on both sides with conical or concave or convex shapes.

13. The transport apparatus as claimed in claim 3, characterised in that at least one outer lateral surface has a plurality of contiguous sections, either bent or free of sharp bends, with a straight and/or arcuate contour shape.

14. The transport apparatus as claimed in claim 13, characterised in that at least one outer lateral surface has a central cylindrical section and sections adjacent to it on both sides with conical or concave or convex shapes.

* * * * *